United States Patent [19]

Clements

[11] 4,306,643
[45] Dec. 22, 1981

[54] COAL FEED PIPE AND POSITIONER

[75] Inventor: Ronald J. Clements, Capel, Australia

[73] Assignee: The Direct Reduction Corporation, New York, N.Y.

[21] Appl. No.: 82,138

[22] Filed: Oct. 5, 1979

[51] Int. Cl.³ .................... B65G 11/10; B65G 53/54; F23K 3/00
[52] U.S. Cl. .................... 193/16; 406/166; 431/189
[58] Field of Search .................. 193/16; 406/115, 166; 239/273, 282, 283, 587, 588, DIG. 12; 110/104 R, 104 B, 182.5; 431/189; 248/287; 89/36 L, 41 R, 41 A; 72/384, 385, 305; 226/199; 242/157 R, 157.1

[56] References Cited

U.S. PATENT DOCUMENTS

| | | | |
|---|---|---|---|
| 2,336,269 | 12/1943 | Luellen | 431/189 |
| 2,358,982 | 9/1944 | Lewis | 431/189 |
| 2,404,663 | 7/1946 | Shommer | 431/189 |
| 3,662,696 | 5/1972 | Mahr et al. | 110/182.5 |
| 4,171,950 | 10/1979 | Bliemeister | 110/182.5 X |

FOREIGN PATENT DOCUMENTS 1517314  7/1978  United Kingdom ................ 239/588

Primary Examiner—James L. Rowland

Attorney, Agent, or Firm—Cooper, Dunham, Clark, Griffin & Moran

[57] ABSTRACT

A system for feeding coal or other material blown from a pipe in a desired trajectory is disclosed including a positioning device for applying directional force to the midsection of the pipe to produce slight bending for orienting the free end, which device has an horizontal adjustment member and a vertical adjustment member. Each comprising a slotted arm with an integral handle mounted on three congruent support plates and pivoted respectively in the interstices between the middle and outer plates. The plates have concentric circular openings therein through which a sleeve for passing the pipe therethrough axially extends. The sleeve also passes through the respective slots in the arms of the adjustment members, so that when the handle of the vertical adjustment member is pivoted in either direction about a pivot pin disposed through one side of the three plates, the pipe will be bent to displace its axis vertically, while pivoting of the horizontal adjustment member about a pivot pin passing through the lower portion of the three plates bends the pipe to displace its axis horizontally. The three plates are also provided with the locking pins which may be passed respectively through holes at the opposite ends of the slots from the pivots in each of the adjustment members to lock the members in their desired positions after adjustment.

11 Claims, 2 Drawing Figures

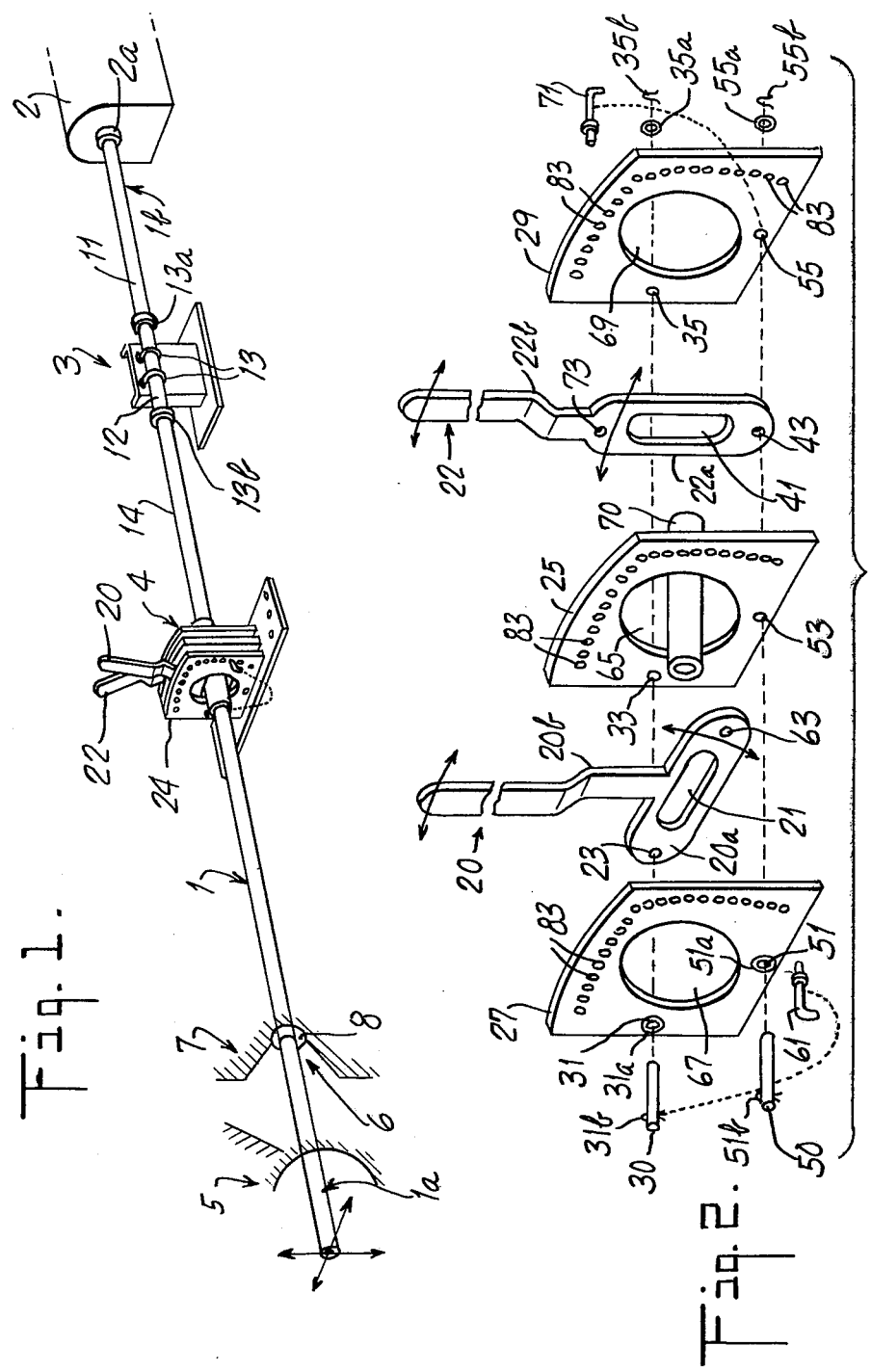

COAL FEED PIPE AND POSITIONER

BACKGROUND OF THE INVENTION

The present invention relates to a system for controlling the trajectory or direction of flow of a material from an elongated pipe and more particularly to an apparatus for adjusting the orientation of the free or discharge end of a feed pipe through selective bending of the pipe axis along its length.

In many industrial applications elongated structural members such as pipes, must be precisely positioned and supported, especially when they are used as flow pipes to conduct and feed various fluent materials. Such pipes are often disposed in unusual or hostile environments so that problems are presented in adjusting or reorienting the end of the pipe to alter the direction of flow. One specific application of this type is found in the feeding of coal to a rotary kiln for the direct reduction of iron ore and ores containing iron, wherein the feed end of the pipe extends into the discharge end of the kiln and blows coal through a desired trajectory into a selected region of the kiln bed. Accordingly, the orientation of the feed end of the pipe must be carefully adjusted to ensure that the coal lands in the desired region of the bed, but the environment poses severe demands on any adjustment mechanism which might be used at this location.

An object of the present invention is to provide a system and apparatus for adjusting the orientation of the feed ends of such pipes or related structural members in environments rendering adjustment control difficult, and which apparatus is simply constructed and readily operable by an unskilled worker without the need for special training or tools.

The invention is particularly intended for use in connection with the feeding of coal to a rotary kiln for performing a direct reduction process of the type such as disclosed in U.S. Pat. No. 3,890,138 to Hockin.

SUMMARY OF THE INVENTION

The present invention involves a system for selectively feeding a fluent material and including an elongated structural member, such as a pipe for conducting the fluent material and discharging the material from a free end, in combination with a positioning device for applying directional force to a region of the pipe, displaced from the free end, to produce slight bending of the pipe axis and thus reorienting the direction of the free end and the trajectory of the fed material.

More particularly, the pipe is fixed at one end to a source of the fluent material, and the positioning device, in the form of a scissors-like apparatus having an horizontal adjustment member and a vertical adjustment member, may be disposed at an intermediate region along the pipe between the feed end and the free end. The adjustment members are pivotally mounted on a support device composed of three congruent plates having concentric circular openings therein through which the pipe extends. Both of the adjustment members comprise a slotted arm with an upstanding handle and are respectively pivoted in the interstices between the middle and outer plates with the pipe passing through their slots. The slot in the vertical adjustment member extends horizontally so that when its upstanding handle is pivoted in either direction about a pivot pin disposed through one side of the three plates, the pipe will be bent to displace its axis vertically, while the horizontal adjustment member has a vertical slot therein which when pivoted about a pivot pin passing through the lower portion of the three plates, bends the pipe to displace its axis horizontally. The bending of the pipe axis accordingly reorients the free end vertically and horizontally.

The three plates of the support device are also each provided with a registering set of holes, extending across their upper portions and down the sides opposite the sides through which the vertical adjustment member pivot pin is disposed, which holes accommodate the passage of two locking pins adapted to be respectively passed through matching holes, at the opposite ends of the slots from the pivots, in each of the adjustment members to lock the members in their desired positions after adjustment. A loosely fitting sleeve member may be disposed about the pipe in the region which extends through the positioning device to avoid localized stress on the pipe surface and possible denting thereof by the adjustment members.

BRIEF DESCRIPTION OF THE DRAWINGS

FIG. 1 is a perspective view of a feed pipe system including a pipe positioner in accordance with the present invention.

FIG. 2 is an exploded view showing the details of the components of the pipe positioner of FIG. 1.

DETAILED DESCRIPTION OF THE INVENTION

A system in accordance with the present invention is shown in perspective in FIG. 1 and generally comprises a feed pipe 1 through which a fluent material is conducted for projection from free end 1a, a source 2 of fluid material connected to the opposite end 1b of the pipe for feeding the material thereto, a support device 3 for maintaining the feed end 1b of the pipe in a fixed position, and a pipe positioning apparatus 4 disposed about the pipe at a location along its length a distance from the free end 1a, preferably in a region intermediate its ends. The system is particularly suitable for use in blowing coal into the discharge end of a rotary kiln in a direct reduction process of the type such as disclosed in U.S. Pat. No. 3,890,138 to Hockin and thus will be described in this context. Accordingly, the source of fluid material 2 may be a coal fireman to which the feed end 1b of the pipe is fixed in position by a suitable bolt joint 2a. The free or discharge end 1a of the pipe enters the discharge end 5 of the kiln via a port 6 in a kiln discharge head 7 and the pipe is loosely supported in the port by a suitable supporting collar 8. With this arrangement a simple alteration of the direction of the trajectory of the blown coal may be achieved by altering the orientation of feed end 1a through application of directional force to the midsection of the pipe causing slight bending of the pipe axis and appropriate displacement of free end 1a. The pipe positioning apparatus 4 is designed to apply the desired controlled force.

The particular components of the positioning apparatus 4 are shown in the exploded view in FIG. 2. The essential components of the positioner 4 include: a vertical adjustment member 20 composed of a slotted arm 20a and an upstanding handle arm 20b; an horizontal adjustment member 22 also composed of a slotted arm 22a and an upstanding handle arm 22b; and a mounting structure 24, which may be composed of a central plate 25 and other plates 27 and 29, on which the adjustment members are pivotally mounted.

It will be seen that the vertical adjustment member 20, when mounted, has the long axis of slotted arm 20a, and the elongated slot 21 therein, disposed substantially horizontally, with the upstanding arm 20b arranged substantially normal or perpendicular to this axis. For the purpose of mounting the member 20, an aperture 23 is formed in the arm 20a toward one side and substantially coaxially with the long axis of slot 21, which aperture receives a pivot pin 30. Registering apertures 31, 33, and 35 are also formed respectively in plates 27, 25 and 29 for accommodating the pin 30 and thus to pivotally support vertical adjustment member 20 on mounting structure 24. Pin 30 is held in place in the apertures by means of flat washers, 31a and 35a, and split pins, 31b and 35b, which are respectively connected to its opposite ends and engage the outer faces of plates 27 and 29. When so mounted, if the upper end or handle portion of upstanding arm 20b is displaced in either direction, as indicated by the arrows, the slot 21 will undergo generally vertical movement about pivot pin 30.

The horizontal adjustment member 22, when mounted, has the long axis of slotted arm 22a, and the elongated slot 41 therein, disposed substantially vertically, with the upstanding arm 22b arranged substantially coaxially therewith. For the purpose of mounting member 22 an aperture 43 is formed in the arm 22a at its lower end and also substantially coaxially with the long axis of slot 41, which aperture receives a pivot pin 50. Registering apertures 51, 53, and 55 are also formed respectively in plates 27, 25 and 29 for accommodating the pin 50 and thus act to pivotally support horizontal adjustment member 22 on mounting structure 24. Pin 50 is held in place in the apertures by means of flat washers, 51a and 55a, and split pins, 51b and 55b, which are respectively connected to its opposite ends and engage the outer faces of plates 27 and 29. When so mounted, if the upper end or handle portion of upstanding arm 22b is displaced in either direction, as indicated by the arrows, the slot 41 will undergo generally horizontal movement about pivot pin 50.

To hold the two adjustment members 20 and 22 in a given position on mounting structure 24 a series of holes 83, numbering approximately 25 or 30, are formed in registration in the three plates 25, 27 and 29 across their top portions and down the opposite side from the pivot pin 30. The registering sets of holes in the plates are arranged to successively register with an aperture 63 formed substantially coaxially with slot 21 in the opposite end of arm 20a from aperture 23 on vertical adjustment member 20, and with an aperture 73 formed substantially coaxially with slot 41 on the opposite side of arm 22a from aperture 43 of the horizontal adjustment member 22, when the adjustment members are pivotally moved. Suitable locking pins 61 and 71 are provided for respective insertion through the appropriate registering holes 83 and apertures 63 and 73 when the proper pipe orientation has been set by the adjustment members 20 and 22.

In order to pass the pipe 1 through the positioner 4, the plates 25, 27, and 29 have substantially circular cooperating openings, 65, 67, and 69 formed therein which in combination with the slots 21 and 41 surround a tubular sleeve 70 that is loosely fitted about the pipe at or near the midsection. The outer diameter of sleeve 70 preferably approximates the width of the slots 21 and 41, so that the sides of the slots will press against the outer surface of the sleeve when the adjustment members 20 and 22 are pivoted by movement of the upstanding handles in either direction, as indicated by the arrows in the figure. The diameters of the openings 65, 67, and 69 in the respective plates are essentially identical and considerably larger than the outer diameter of the sleeve 70 to permit free bending of the axis of the pipe when pressure is applied to the pipe through the sleeve upon movement of the adjustment members.

Turning now to assembly and operation of the system, it will be seen in FIG. 1 that a section 11 of the pipe at the feed end 1b may be connected to the coal fireman 2 in a fixed position. The opposite end of this section from the fireman may be connected to a second section 12, which is bolted by a set of U-bolts 13 to the support 3 and connected at one end by a victaulic snap-joint coupling 13a to the feed pipe section 11 and at the opposite end by a similar victaulic snap-joint coupling 13b to the main conduction pipe section 14. The main conduction pipe section 14 is passed at or near its midpoint through the loose fitting sleeve 70 disposed in the pipe positioner 4 and its free end 1a is extended through port 6 in kiln discharge head 7 into the discharge end of the kiln 5. In practice the axis of the pipe 1 at end 1a will be offset above and to one side of the center line of the kiln 5.

When it is desired to adjust the orientation of the discharge end 1a of the pipe, the axis of the pipe may be bent selectively in the horizontal and vertical directions by the pipe positioner 4. More particularly, a workman or operator may simply grasp either of the upper ends or handle portions of the adjustment members, 20 and 22, whose upper ends are offset from each other to permit a reasonable clearance therebetween. Movement of the vertical adjustment member 20 to the left in FIG. 2 will pivot the member such that the lower wall of slot 21 will engage and press against the underside of sleeve 70, vertically reorienting the axis of the pipe and causing the center line of discharge end 1a to move downwardly. Conversely, movement of the handle of member 20 to the right in FIG. 2 will press downwardly on sleeve 70 bending the pipe axis downwardly and moving the center line of free end 1a upwardly within the kiln.

Similarly, movement of horizontal adjustment member 22 to the left in FIG. 2 will cause the right hand side of slot 41 to press against the right hand side of sleeve 70 bending the pipe axis to the left, so that discharge end 1a till be reoriented to the right in FIG. 1. Conversely, movement of member 22 to the right in FIG. 2 will bend the pipe axis to the right causing discharge end 1a to move to the left in FIG. 1.

When the free end 1a of the pipe has been properly reoriented, the vertical adjustment member locking pin 61 and horizontal adjustment member locking pin 71 are inserted through the respective holes 83 in the three plates that are found in registration with apertures 63 and 73 so that the pipe will be held in the desired position.

Thus, alterations to the position of the pipe may be quickly and easily completed during kiln operation or inspection by a single unskilled operator through a simple manipulation of the two scissors-like handles. The loose-fitting sleeve member 70 avoids denting of the main feed pipe 14 by the positioning apparatus 4.

While the invention has been particularly described in connection with a coal feeding system, it will be seen that it may readily be adapted by those skilled in the art to many other applications wherein the axis of an elongated member is reoriented or bent, whether or not any material is fed through the member, which applications will be within the scope of the invention.

What is claimed is:

1. Apparatus for adjusting the orientation of the free end of a pipe from which coal or other material is fed, comprising:
   first positioning means for applying a vertical bending force to said pipe in a region along its length displaced from said free end and comprising:
   a first slotted arm having a first elongated slot therein through which said pipe is passed; and
   a first upstanding handle arm connected to said first slotted arm and oriented substantially normally to the long axis of said first slot;
   second positioning means for applying a horizontal bending force to said pipe in said region along its length displaced from said free end and comprising:
   a second slotted arm having a second elongated slot therein through which said pipe is passed; and
   a second upstanding handle arm connected to said second slotted arm and oriented substantially coaxially with the long axis of said second slot; and
   mounting means for mounting said first and second positioning means and comprising:
   first means for pivoting said first slotted arm about a point toward one end substantially coaxial with the long axis of said first slot; and
   second means for pivoting said second slotted arm about a point toward one end substantially coaxial with the long axis of said second slot.

2. Apparatus as in claim 1 wherein said mounting means comprises at least one upstanding plate having an opening therein for passing said pipe and registering with said first and second slots in said first and second positioning means.

3. Apparatus as in claim 2 wherein said first pivoting means comprises a pivot toward one side of said plate adjacent said opening and said second pivoting means comprises a pivot on the lower part of said plate adjacent said opening.

4. Apparatus as in claim 2 wherein said mounting means further comprises means for locking said first and second positioning means with respect to said plate.

5. Apparatus as in claim 4 wherein said locking means comprises:
   means defining first aperture in said first slotted arm toward the end opposite the pivoted end and in substantial coaxial alignment with the long axis of said first slot;
   means defining a second aperture in said second slotted arm toward the end opposite the pivoted end and substantially aligned coaxially with the long axis of said second slot;
   a plurality of holes in said plate arranged to sequentially register with said first and second apertures in said first and second slotted arms when said arms are pivoted; and
   locking pin means for respectively extending through respective holes in said plate and said first and second apertures in said first and second slotted arms to lock said first and second positioning means against movement with respect to said plate.

6. Apparatus as in claim 1 wherein said mounting means comprises three plates, disposed parallel to each other along the axis of said pipe, with said first positioning means disposed between one outer plate and the intermediate plate and said second positioning means disposed between the other outer plate and the intermediate plate, each of said plates comprising:
   means defining an opening in said plate for accommodating the passage of said pipe;
   means defining an aperture toward one side of the plate adjacent said opening for accommodating the passage of said first pivoting means; and
   means defining an aperture on the lower part of the plate adjacent said opening for accommodating the passage of said second pivoting means.

7. Apparatus as in claim 6 wherein each of said plates further comprises means defining a series of holes in the upper part of the plate above said opening and in the side of the plate opposite said first pivoting means adjacent said opening for accommodating the passage of a locking pin.

8. Apparatus as in claim 1 further comprising sleeve means for surrounding said pipe in said region along its length displaced from said free end.

9. Apparatus for projecting fluent material through a desired trajectory comprising:
   pipe means having a fixed end accepting the fluent material therein and a free end for directing the fluent material through the desired trajectory;
   positioning means for applying bending forces to said pipe means in a region along its length displaced from said free end and comprising:
   first adjusting means for applying a vertical force to bend said pipe means in said region vertically displacing its free end; and
   second adjusting means for applying a horizontal force to bend said pipe in said region horizontally displacing its free end;
   and wherein said first adjusting means comprises a first member having a first elongated slot therein through which said pipe means is passed and pivoted at one end about a point substantially coaxial with the long axis of said first slot; and a first upstanding handle member connected to said first slotted member and oriented substantially perpendicular to the long axis of said first slot for pivoting said first slotted member.

10. Apparatus as in claim 9 wherein said second adjusting means comprises:
    a second member having a second elongated slot therein through which said pipe means is passed and pivoted at one end about a point substantially coaxial with the long axis of said second slot; and
    second upstanding handle means connected to said second slotted member and oriented substantially coaxially with the long axis of said second slot for pivoting said second slotted member.

11. Apparatus for projecting fluent material through a desired trajectory comprising;
    pipe means having a fixed end accepting the fluent material therein and a free end for directing the fluent material through the desired trajectory;
    positioning means for applying bending forces to said pipe means in a region along its length displaced from said free end and comprising:
    first adjusting means for applying a vertical force to bend said pipe means in said region vertically displacing its free end; and
    second adjusting means for applying a horizontal force to bend said pipe in said region horizontally displacing its free end; mounting means for supporting said positioning means and comprising:
upstanding plate means for accommodating the passage of said pipe means therethrough; and
first and second pivot means on said plate means for respectively supporting said first and second adjusting means for pivotal movement in a generally vertical plane.

* * * * *